Dec. 22, 1970    T. WATKIN    3,548,669
INTERMITTENT DRIVE

Filed June 3, 1969    2 Sheets-Sheet 1

INVENTOR
*THEODORE WATKIN*
BY
*Kenneth E. Merklen*
ATTORNEY

Dec. 22, 1970    T. WATKIN    3,548,669
INTERMITTENT DRIVE
Filed June 3, 1969    2 Sheets-Sheet 2

INVENTOR
THEODORE WATKIN
BY
Kenneth E. Merklen
ATTORNEY

United States Patent Office 3,548,669
Patented Dec. 22, 1970

3,548,669
INTERMITTENT DRIVE
Theodore Watkin, Stamford, Conn., assignor, by mesne assignments, to Ivanhoe Research Corporation, New York, N.Y., a corporation of Delaware
Filed June 3, 1969, Ser. No. 829,905
Int. Cl. F16h 35/02
U.S. Cl. 74—84                                4 Claims

ABSTRACT OF THE DISCLOSURE

A first pulley, offset from an axis is revolved about the offset axis. As the first pulley revolves, it functionally rotates. The first pulley is spaced from a second pulley by a first connecting link and connected to the second pulley by a drive belt. The revolving and functional rotating motion of the first pulley is converted to an oscillating and active rotational motion of the second pulley. A second link, pivotally coupled to the axis of the second pulley at one end and pivotally coupled to a second axis at the other end, limits the oscillating motion of the second pulley essentially converting such motion into a reciprocating, arcuate motion about the second axis. A third pulley having an axis common with the second axis is coupled to the second pulley by a drive belt. As the first pulley revolves about the offset axis, the second pulley rotates on its own axis and reciprocates about the axis which is common with the axis of the third pulley and the third pulley is driven on an intermittent basis.

---

The present invention relates to intermittent drive mechansms. In particular the present invention relates to intermittent indexable drive mechanisms which may provide an intermittent, rotary drive of a predetermined, accurate travel with smooth acceleration from full stop or minimum drive speed to maximum drive speed and smooth deceleration from maximum speed to full stop or minimum drive speed.

A successful embodiment of the invention herein may include a mechanical arrangement of a first drive pulley or gear mounted on a revolving arm which revolves about a drive axis. The presented embodiment includes such drive gear in fixed relation to the revolving arm. Such pulley functionally rotates as it revolves with the rate of rotation being equal to the rate of revolution. Coupled to the first pulley by a connecting arm or link is a second pulley or gear which partially revolves or oscillates about a fixed axis. In addition, a timing or drive belt or drive chain couples the first pulley and the second pulley so that as the first pulley revolves 360° about its drive axis, the second pulley oscillates or pivots back and forth arcuately about a pivot or fixed axis and as the first pulley functionally rotates, the second pulley actually rotates on its own axis. A third pulley, rotatably mounted on an axis which is common with the pivot axis of the second pulley, is coupled to the second pulley by a second timing or drive belt or drive chain and the third pulley or gear intermittently rotates with accelerating and decelerating speed in response to the combined rotation of the second pulley about is own axis and the arcuate, reciprocating travel of the second pulley about the common axis.

In accordance with the relative dimensions or size of the pulleys or gears, with respect to each other and the length of the arms with respect to each other (the arm linkage may be referred to as a "four bar link"), the angular displacement or rotational displacement of the third pulley may be controlled. Acceleration from a dead stop (or from a minimum rotational speed, or from reverse rotational speed) to a maximum rotational speed is effected during one half of the effective cycle of operation and during the other half of the effective cycle of operation, deceleration from the maximum rotational speed to the dead stop (or minimum rotational speed, or reverse rotational speed) is effected.

A table or supporting surface may be coupled to the third pulley or gear and the table or supporting surface may then be rotated, in a manner directly proportional to the manner in which the third pulley is driven. Other coupling drives which utilize the intermittent rotary motion of the third pulley may provide an intermittent linear drive with smooth acceleration and deceleration, if desired.

The intermittent rotary indexing of a plate or supporting surface with accurate travel and smooth and uniform acceleration and deceleration is very useful in positioning such plate or supporting surface for removal of units stored on the plate or for stacking units on the plate.

The intermittent indexing drive may be used as a means to uniformly incrementally advance or stop, with smooth and uniform acceleration and deceleration, a vehicle, such as a conveyor, for example, by using the third pulley or gear as a drive means. Such gear may be suitable coupled or geared to the vehicle to be advanced, for example, via a roller used and coupled for driving conveyor belt, to linearly incrementally advance or move the conveyor, as desired.

It is therefore an object to provide an intermittent indexable drive with accurate travel and smooth acceleration and smooth deceleration.

Another object is to provide an intermittent, rotary indexable drive which intermittently rotates a surface on a predetermined basis with smooth acceleration and smooth deceleration between start and stop.

These and other objects will become apparent from reading the following detailed description of an embodiment of the invention with reference to the accompanying drawings in which.

Figure 2:
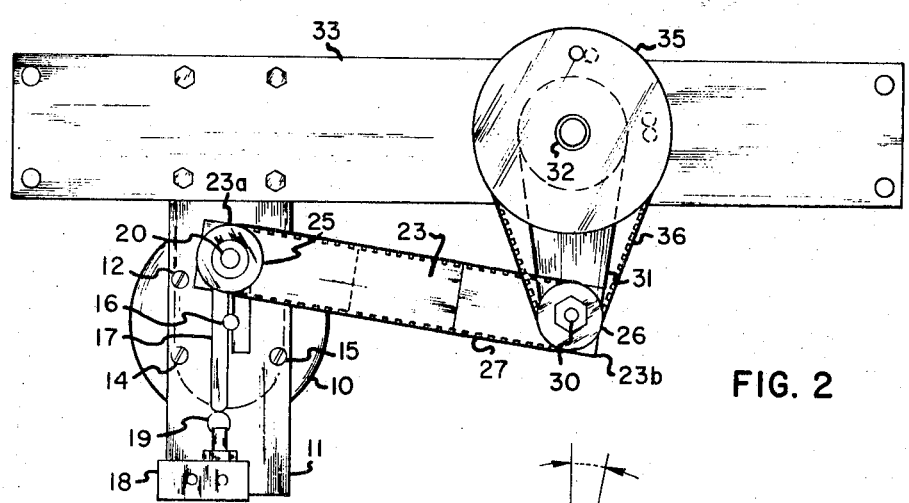
FIGS. 2, 3 and 4 are plan views of the embodiment of FIG. 1 shown in different phases of a cycle of operation.
Figure 3:
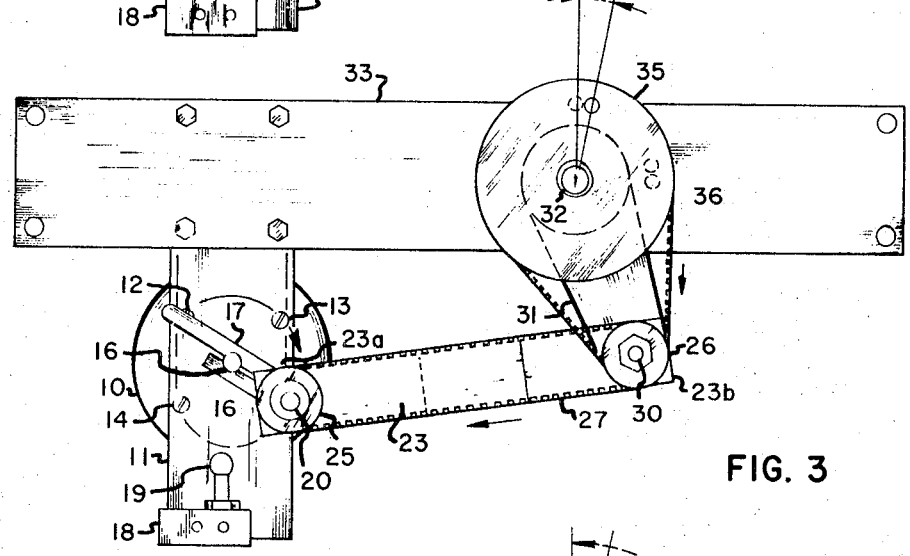
Figure 4:
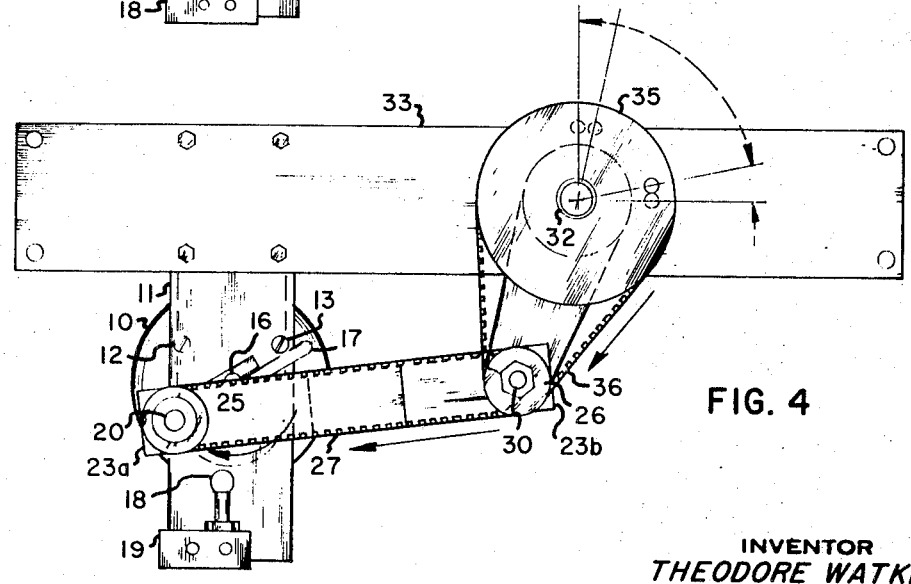

Referring to the drawings, a drive means, represented by a motor 10 (seen in FIGS. 2, 3 and 4) is mounted on a frame 11 by four screws 12, 13, 14 and 15. Part of member 11 and member 33 represent one bar or like of the "four bar linkage." The motor 10 is mounted so that its drive shaft 16, extends beyond the surface of the frame member 11. It will be appreciated that other drive means may be used to rotate a drive shaft such as 16, if desired.

Figure 1:
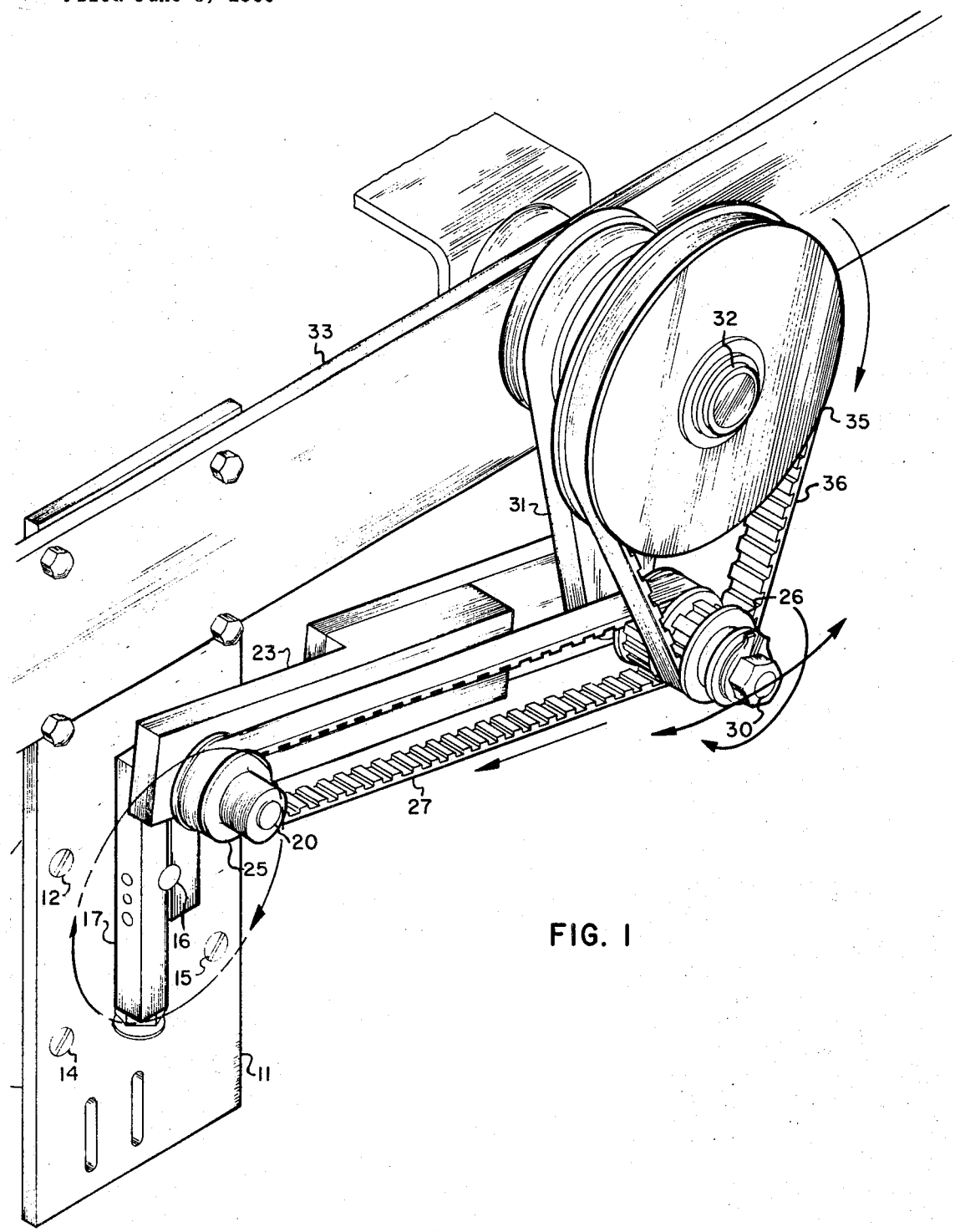
FIG. 1 is a pictorial view of one embodiment of the invention.

A clmp arm 17 is secured to the drive shaft 16 so that the clamp 17 will rotate with the drive shaft 16. Although several different types of clamps may be used for the function served by clamp 17, it will be noted that clamp 17 is represented as a two-piece clamp. The pieces of the clamp 17 are secured together and are clamped to the drive shaft 16. One part of the two-piece clamp is longer than the other part so that the long part makes contact with a component of a micro switch or counter 18 upon each revolution of the clamp. Note particularly FIG. 2 where the long part of clamp 17 makes contact with, and depresses component 19 of the switch or counter 18. The switch 18 is omitted from the drawing in FIG. 1 but the mounting holes appear on the frame member 11.

The clamp 17 includes at its one end a shaft 20 extending from the clamp 17 and essentially parallel with the drive shaft 16. Preferably the shaft 20 is rigid or fixed so that when the drive shaft 16 rotates the clamp 17 will rotate with the drive shaft 16 and the shaft 20 will revolve or orbit the drive shaft 16. That portion of clamp 17 between drive shaft 16 and shaft 20 represents a second arm or bar of the "four bar linkage."

Coupled to the shaft 20 is a cnonecting link 23. Link 23 represents a third bar of the "four bar linkage." The link 23 is rotatably coupled to the shaft 20 so that the portion 23a of the link 23 through or by which the shaft 20 is coupled, revolves or orbits about the drive shaft 16 but the portion 23b (the other end of the link 23) may reciprocate back and forth.

A pulley or gear 25 is rigidly mounted on the shaft 20 so that the pulley does not rotate on or about the shaft 20. The fixed pulley 25 therefore revolves about or orbits the drive shaft 16 as the drive shaft 16 rotates. In addition, as the fixed pulley 25 revolves about shaft 20 the pulley 25 functionally rotates and the rate of revolution and the rate of functional rotation are equal.

At the end 23b of link 23 a double pulley or gear 26 is rotationally mounted on the link 23. A drive or timing belt or drive chain, 27, illustrated as a toothed timing belt, couples one section of the rotatably mounted double pulley 26 to the rigid or fixed pulley 25.

Thus there has now been provided a fixed pulley which revolves or orbits about the drive shaft and simultaneously functionally rotates and a rotatably mounted pulley positively spaced from the fixed pulley but coupled by a drive belt so that as the fixed pulley 25 revolves about the drive shaft, the rotatably mounted pulley 26 reciprocates back and forth in phase with the revolving fixed pulley and actively rotates on its axis. It will be noted that actual revolution and effective rotation of pulley 25 and actual rotation of pulley 26 are all in the same direction.

The revolutions per time period of the fixed pulley 25 depends upon the speed of rotation of the drive shaft 16. However, the speed of rotation of the rotatably mounted pulley 26 depends on the speed of revolution of pulley 25 and the relative size of the fixed pulley 25 to the rotatably mounted pulley 26. In the embodiment shown, the fixed pulley or gear 25 and the rotatably mounted pulley or gear 26 are illustrated as being substantially the same size. This is for purposes of illustration only. It should also be noted that although the active revolution and effective rotation of gear or pulley 25 and active rotation of gear or pulley 26 are in the clockwise direction, the apparatus may be driven in the counter-clockwise direction if desired, with corresponding effect.

The rotatably mounted double pulley 26 is mounted on a shaft 30 which is mounted on the link 23 at 23b. Also connected to shaft 30 is another arm 31 which is also pivotally coupled to a shaft 32 mounted on the second frame member 33. The arm 31 represents the fourth bar of the "four bar linkage."

A second rotatably mounted pulley or gear 35 is mounted on the shaft 32 and the second part of the double pulley 26 (the first part is coupled to pulley 25 by belt 27) is coupled to the second rotatably mounted pulley 35 by a drive or timing belt or drive chain, represented by toothed drive belt 36.

It will be noticed the described construction permits the double pulley 26 to reciprocate back and forth as the fixed pulley 25 revolves. As the pulley 26 reciprocates back and forth the center of pulley 26 scribes an arc, of which the shaft 32 is the axis. Pulley 25 also functionally rotates as it revolves and in response to such functional rotation the double pulley 26 actively rotates on its own axis (shaft 30). Thus, the orbital travel of the fixed pulley 25 is transformed into the reciprocating, arcuate travel of pulley 26 about an offset axis and effective rotation of pulley 25 is transformed in actual rotation of pulley 26 about its own axis.

As the pulley 26 rotates clockwise, for example, the belt 36 is driven clockwise and potentially rotates the pulley 35 in clockwise direction. During the forward excursion of the arcuate travel of the pulley 26 (forward, that is, traveling toward the shaft 16) the pulley 26 effectively "pulls" the drive belt 36. The combined action of the effective "pulling" and the rotational driving of the belt 36 drives the driving belt, and therefore the pulley 35, faster than rotational drive alone.

During the backward excursion of the arcuate travel of the pulley 26 (backward, that is, traveling away from the shaft 16) the pulley 26 effectively "walks-along" or "rolls-back-along" the drive belt 36. The effective "walking-along" of the pulley 26 on the belt 36 counteracts the rotational driving of the belt 36 and therefore the belt 36 (and the pulley 35) is driven slower than by rotational drive alone.

One full cycle of operation, or full cycle may be defined as a 360° revolution of the fixed pulley 25 around the drive shaft 16. At a predetermined point, during each cycle, the output shaft 32 may be brought to a complete rest without interrupting the orbital travel of the pulley 25. By changing the size (diameter) relation between the fixed pulley 25 and the rotatory mounted pulley 26, the output shaft 32 may be made to continuously rotate in the same direction while decelerating to a minimum speed of rotation and the accelerating to a maximum speed of rotation during each cycle, without stopping. By reversing the size (diameter) relationship between the pulleys 25 and 26 the output shaft 32 may be made to reverse itself during each cycle.

By changing other parameters of the apparatus, for example, the size (diameter relation between pulley 26 and pulley 35, the angular displacement of the output shaft 32, on a per cycle basis may be changed as desired.

Thus, an embodiment of the invention has been described and certain parameter changes have been discussed for obtaining different angular displacements and characteristics in travel of the output shaft. Other changes, as may hereafter become obvious to those skilled in the art, may be made without departing from the spirit of the invention as defined in the appended claims.

What is claimed is:

1. An intermittent drive including;
    means for revolving a first pulley about a first axis,
    a rotatable pulley,
    a connecting arm for spacing said rotatable pulley from said first pulley at a fixed distance, as said first pulley revolves about said first axis,
    belt means coupling said first pulley to said rotatable pulley for driving said rotatable pulley as said first pulley revolves about said first axis,
    a second axis,
    a second connecting arm for maintaining a spaced relation between said rotatable pulley and said second axis while said rotatable pulley is held in spaced relation from said first pulley,
    a second rotatable pulley having an axis common with said second axis,
    second belt means coupling said rotatable pulley to said second rotatable pulley for intermittently driving said second rotatable mounted pulley in response to continued revolution of said first pulley.

2. An intermittent drive as in claim 1 and in which said means for revolving a first pulley includes;
    a drive shaft,
    means for rotating said drive shaft,
    a third connecting arm coupled to said drive shaft so that at least one end of said third connecting arm revolves about said drive shaft,
    said first pulley being mounted on said one end of said third connecting arm so that said first pulley revolves about said drive shaft and
    said first axis is common with the axis of said drive shaft.

3. An intermittent drive including;
    a drive shaft rotatable on its axis,
    a first arm coupled to said drive shaft and having an end thereof revolvable about said drive shaft, first pulley means, coupled to said end for revolving about said drive shaft while functionally rotating, a first link pivotally coupled at one end to said first arm so that said one end of said first link revolves about said drive shaft with said first pulley means and the other end of said first link reciprocates toward and away from said drive shaft, second pulley means rotatably coupled to said other end of said first link, belt drive means for coupling said first pulley means to said second pulley means for actively rotating said second pulley means in response to the functional rotation of said first pulley means, a second arm pivotally coupled to said other end of said first link, a second link coupling said second arm and said first arm, said second arm pivotally coupled to said second link for maintaining the reciprocating movement of said other end of said second arm in arcuate configuration, third pulley means rotatably coupled to said second arm and having a common axis therewith, and second belt drive means for coupling said second pulley and said third pulley for driving said third pulley as said second pulley rotates and reciprocates.

4. An intermittent drive for angularly displacing a drive means with smooth acceleration and smooth deceleration in response to 360° travel, at uniform speed of a primary drive means including;

a drive shaft driven by said primary drive means, a first pulley coupled to said drive shaft and spaced therefrom for revolving about said drive shaft, the angular displacement of said first pulley being in fixed relation to said drive shaft so that as said first pulley revolves about said drive shaft said first pulley functionally rotates, a second pulley coupled to said first pulley and spaced therefrom, reciprocating means for said second pulley so that as said first pulley revolves about said drive shaft said second pulley reciprocates toward and away from said drive shaft, belt drive means coupling said first pulley to said second pulley for actively rotating said second pulley in response to the functional rotation of said first pulley, a third pulley coupled for rotating about an axis, means for spacing said second pulley from said axis for converting the reciprocating travel of said second pulley into arcuate reciprocating travel about said axis, and second belt drive means coupling said second pulley to said third pulley for driving said third pulley at a substantially continuously changing rate in response to the combined rotational displacement and reciprocating travel of said second pulley.

References Cited

UNITED STATES PATENTS

| | | | |
|---|---|---|---|
| 3,127,777 | 4/1964 | Pietsch | 74—84 |
| 3,309,935 | 3/1967 | Jurny et al. | 74—393 |
| 3,364,770 | 1/1968 | Button et al. | 74—394 |

MILTON KAUFMAN, Primary Examiner

U.S. Cl. X.R.

74—82, 319, 320, 394